US 7,120,643 B2

(12) United States Patent
Dill

(10) Patent No.: US 7,120,643 B2
(45) Date of Patent: Oct. 10, 2006

(54) METHOD, SYSTEM, AND STORAGE MEDIUM FOR CREATING AND MAINTAINING AN ENTERPRISE ARCHITECTURE

(75) Inventor: Robert D. Dill, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 10/299,639

(22) Filed: Nov. 19, 2002

(65) Prior Publication Data

US 2004/0098392 A1 May 20, 2004

(51) Int. Cl.
*G06F 17/30* (2006.01)

(52) U.S. Cl. .................. 707/102; 707/10; 707/101; 707/104.1; 705/10

(58) Field of Classification Search .............. 707/10, 707/101, 104.1, 102; 705/10
See application file for complete search history.

(56) References Cited

U.S. PATENT DOCUMENTS

| 6,154,731 A | 11/2000 | Monks et al. | |
|---|---|---|---|
| 6,401,091 B1 * | 6/2002 | Butler et al. .................. 707/10 |
| 6,411,936 B1 * | 6/2002 | Sanders ....................... 705/10 |
| 6,442,557 B1 * | 8/2002 | Buteau et al. ............... 707/102 |
| 2002/0040309 A1 | 4/2002 | Powers et al. | |
| 2003/0149586 A1 * | 8/2003 | Chen et al. .................... 705/1 |

FOREIGN PATENT DOCUMENTS

| EP | WO 00/41110 | 7/2000 |
|---|---|---|
| EP | WO 01/08038 A2 | 2/2001 |

* cited by examiner

*Primary Examiner*—Tim Vo
*Assistant Examiner*—Hung Pham
(74) *Attorney, Agent, or Firm*—Cantor Colburn LLP

(57) ABSTRACT

An exemplary embodiment of the invention relates to a method, system, and storage medium for creating and maintaining an enterprise architecture over a network. The system comprises at least one client system; a server operably coupled to the client system via the network; a plurality of business applications executable via the server; a data storage device in communication with the server via the network; an enterprise architecture assessment model executing on the system; and a maturity model map generated via the enterprise architecture assessment model. The maturity model map comprises a process component, an organization component, a business component, and a technology component. The maturity model map is generated using information stored in the data storage device. Other embodiments of the invention include a method and storage medium for implementing enterprise architecture assessment model.

26 Claims, 3 Drawing Sheets

METHOD, SYSTEM, AND STORAGE MEDIUM FOR CREATING AND MAINTAINING AN ENTERPRISE ARCHITECTURE

BACKGROUND

This invention relates generally to enterprise architectures, and more particularly, the present invention relates to a method, system, and storage medium for creating and maintaining an enterprise architecture.

An enterprise architecture has been defined as a framework designed to coordinate the many aspects of an enterprise. It is the overall plan that integrates business goals, visions, strategies and governance principles with business operations, such as organizational structure, processes, and data. These, in turn, are integrated with application systems, databases, and the enabling technological infrastructure of the business such as computers, operating systems and networks. Creating an effective enterprise architecture can be difficult due to its inherent complex nature and the inevitable challenges faced in attempting to create synergy among the various interdependent components that comprise the enterprise architecture. Even when an enterprise architecture has been successfully created, the challenges of assessing the ongoing vitality and efficacy of the system, as well as the challenges of redesigning or upgrading the system as the needs of the business change over time, must be considered and addressed.

Current attempts to address these issues include solutions that tackle the efficacy of the architecture, either by analyzing what currently exists, or by providing design guidance on how to create a flexible architecture. What is needed is a way to create and sustain an enterprise architecture.

BRIEF SUMMARY

An exemplary embodiment of the invention relates to a method, system, and storage medium for creating and maintaining an enterprise architecture over a network. The system comprises at least one client system; a server operably coupled to the client system via the network; a plurality of business applications executable via the server; a data storage device in communication with the server via the network; an enterprise architecture assessment model executing on the system; and a maturity model map generated via the enterprise architecture assessment model. The maturity model map comprises a process component, an organization component, a business component, and a technology component. The maturity model map is generated using information stored in the data storage device. Other embodiments of the invention include a method and storage medium for implementing enterprise architecture assessment model.

DESCRIPTION OF THE DRAWINGS

Referring now to the drawings wherein like elements are numbered alike in the several FIGURES.

DETAILED DESCRIPTION OF THE PREFERRED EMBODIMENT

The enterprise architecture assessment model relates to a structured process and system for gathering and analyzing information about an organization in order to determine its current capability to create and sustain and enterprise architecture. The result of this process includes an identification of the root causes of the primary issues facing the architecture team.

Figure 1:
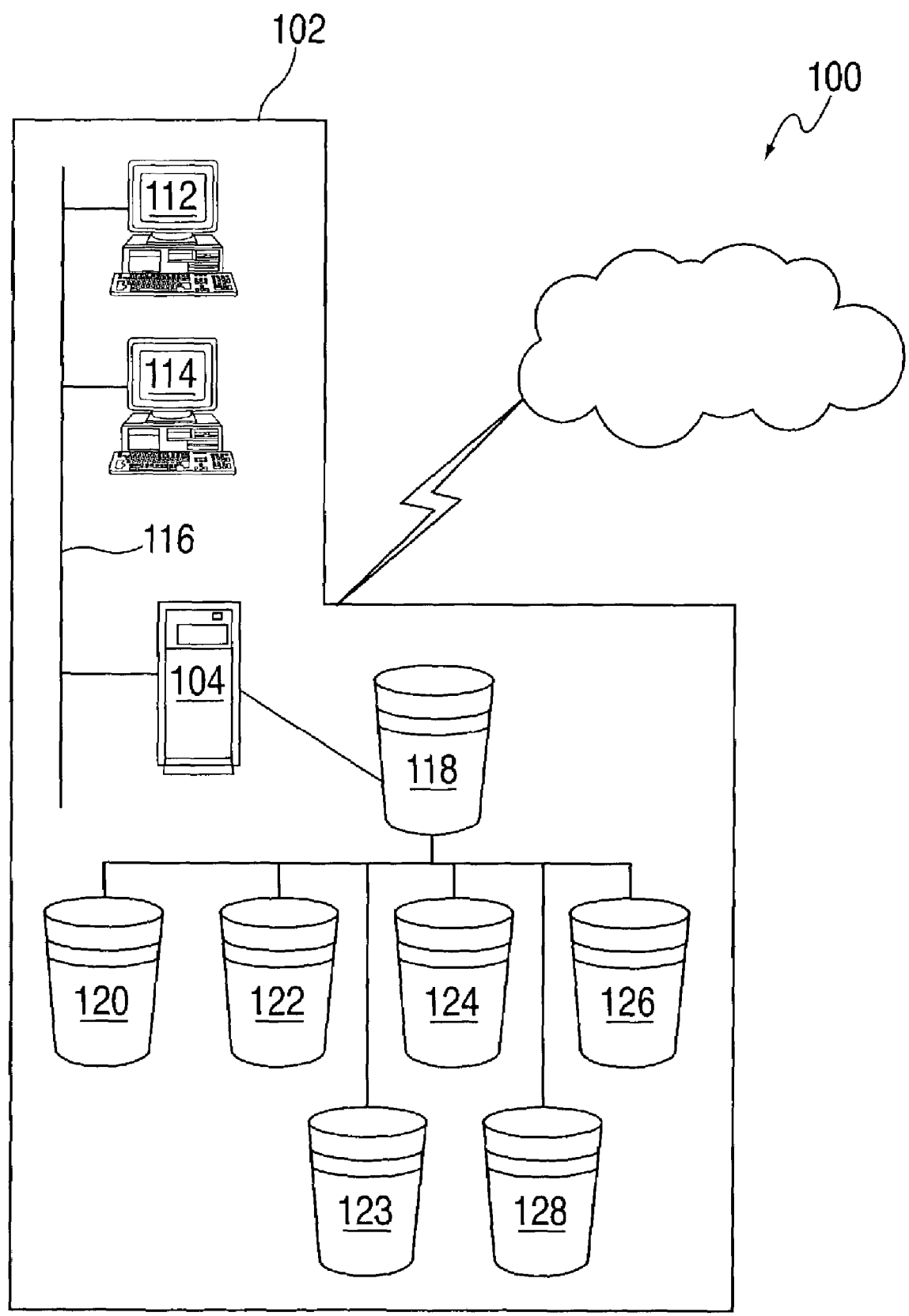
FIG. 1 is a portion of a network system upon which the enterprise architecture assessment model is implemented in an exemplary embodiment.

In an exemplary embodiment, the enterprise architecture assessment model is implemented via a network system such as that depicted in FIG. 1. System 100 may be part of a wide area network including multiple geographical locations that are interconnected by high-speed data lines or radio links. In the simplified diagram of FIG. 1, system 100 includes a business enterprise 102 operating in a client/server architecture mode and client systems 112 and 114 in communication with business enterprise 102 via the Internet. Business enterprise 102 comprises a server 104 and data storage device 118 connected to each other through a network 116. Client systems 112 and 114 represent computer workstations operated by representatives of the business enterprise. These representatives may be IT professionals, architecture specialists, business professionals, management, and system administrators. It should be noted that any number of client systems may be utilized by business enterprise 102. For purposes of illustration, only two client systems 112 and 114 are shown. Each of client systems 112 and 114 may comprise a web-enabled personal computing device such as a desktop, laptop, or other similar apparatus known in the art. The term "business enterprise" refers to the organization implementing the enterprise architecture assessment model of the invention.

Network 116 may comprise a LAN, a WAN, or other network configuration known in the art. Network 116 may include wireless technology, radio-based communications, telephony-based communications, or a combination of the above. For purposes of illustration, however, network 116 is a LAN Intranet. Access is limited to internal devices and applications through a firewall or similar security system (not shown) which protects business enterprise 102 from unauthorized access. Business enterprise 102 is running suitable multi-platform supported server software for creating secure, interactive Internet, Intranet, and Extranet applications, and which allows information in data storage device 118 to be managed and presented to end users such as client systems 112 and 114 via business applications utilizing data management components (e.g., IBM's DB2™) as well as presentation components (e.g., Lotus Domino™ and WebSphere™), a spreadsheet application (e.g., Lotus 1-2-3™), and graphics software. Business enterprise 102 executes the enterprise architecture assessment model, among other applications via server 104, client systems 112 and 114, or a combination of the above. Server 104 allows business enterprise 102 to maintain up-to-date information about the state of the enterprise architecture and the efficacy of the enterprise architecture assessment model process in a real-time environment through its replication features and web browsers. Server 104 shares information with client systems 112 and 114, storing the most current data for access by user systems.

Client systems 112 and 114 may access server 104 via collaboration, application/data sharing, or standard web browsers (e.g. Lotus Notes™—compliant software, HTML based or Java enabled web applications, etc.) located on client systems 112 and 114. Software may be Lotus Notes™ although it is not necessary in order to realize the advantages of the present invention.

Data storage device 118 resides within Intranet 116 and may comprise any form of mass storage device configured to read and write database type data maintained in a file store (e.g., a magnetic disk data storage device). Data storage device 118 is logically addressable as a consolidated data source across a distributed environment such as network system 100. The implementation of local and wide-area database management systems to achieve the functionality of data storage device 118 will be readily understood by those skilled in the art. Information stored in data storage device 118 is retrieved and manipulated via server 104.

A root cause database 120 is associated with data storage device 118 and may be accessed by the enterprise architecture assessment model in order to implement activities described herein. Root cause database 120 stores information including historical data identifying the root causes of issues detected in the past experiences of the business enterprise. This and other information related to activities conducted via the enterprise architecture assessment model will be discussed further in FIGS. 2 and 3. Other information stored in data storage device 118 includes issues database 122, pattern database 123, business impact information 124, best practices repository 126, and statistical database 128 resulting from business applications utilized in the daily operations of an ideal business enterprise. Pattern database 123 stores maturity model maps created via the enterprise architecture assessment model. These maturity model maps comprise various elements defined by the business enterprise to be important in establishing an enterprise architecture. Maturity model maps and these elements are described further in FIGS. 2 and 3. Data storage device 118 resides within enterprise's 102 Intranet 116. Since it is within Intranet 116, it may be made accessible to all of enterprise's 102 employees who have proper access permissions.

Figure 2:
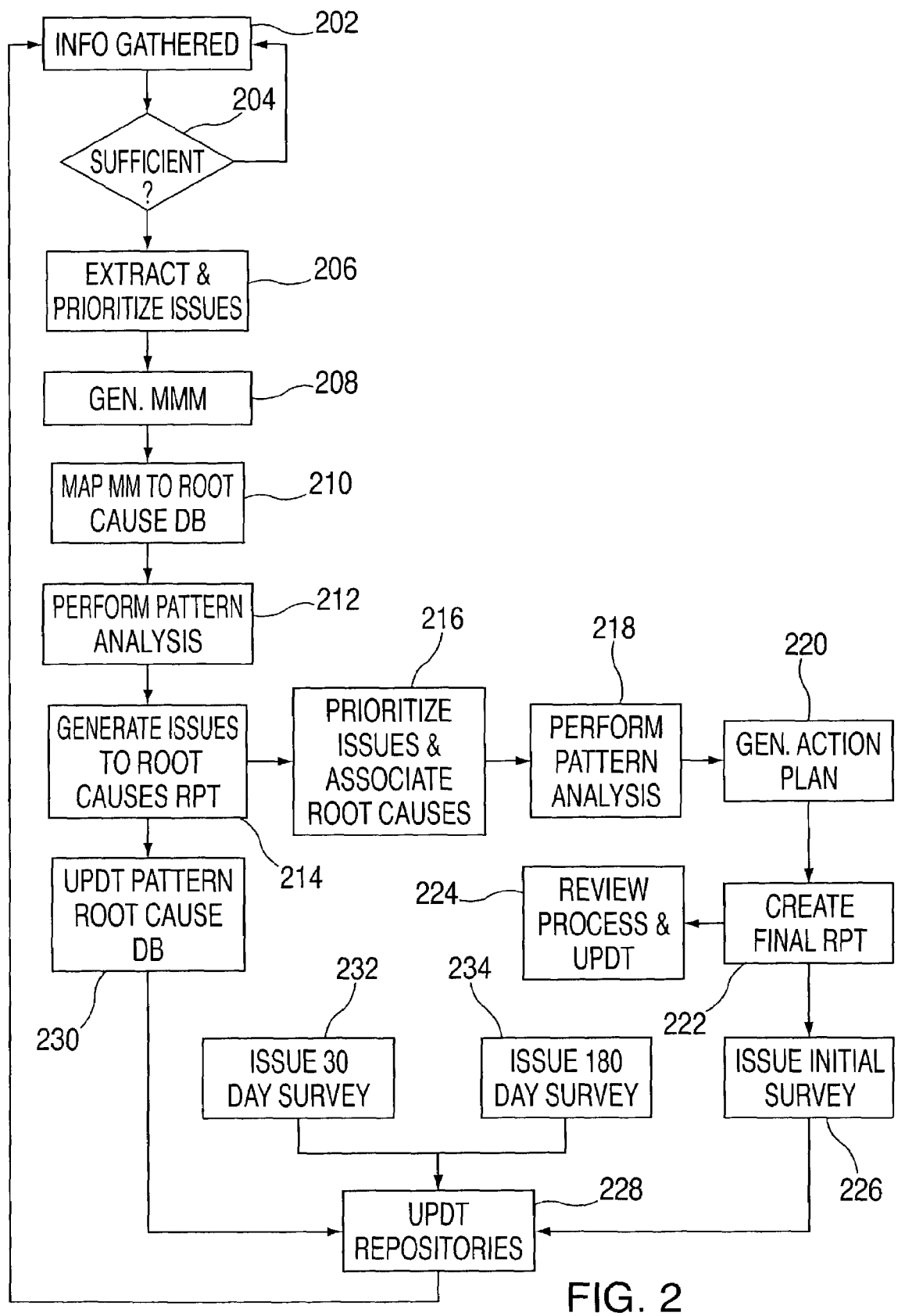
FIG. 2 is a flowchart describing the process of implementing the enterprise architecture assessment model in an exemplary embodiment.

A framework for the flow of information associated with the implementation of the enterprise architecture assessment model is described in FIG. 2 with respect to the creation and maintenance of an enterprise architecture.

Figure 3:
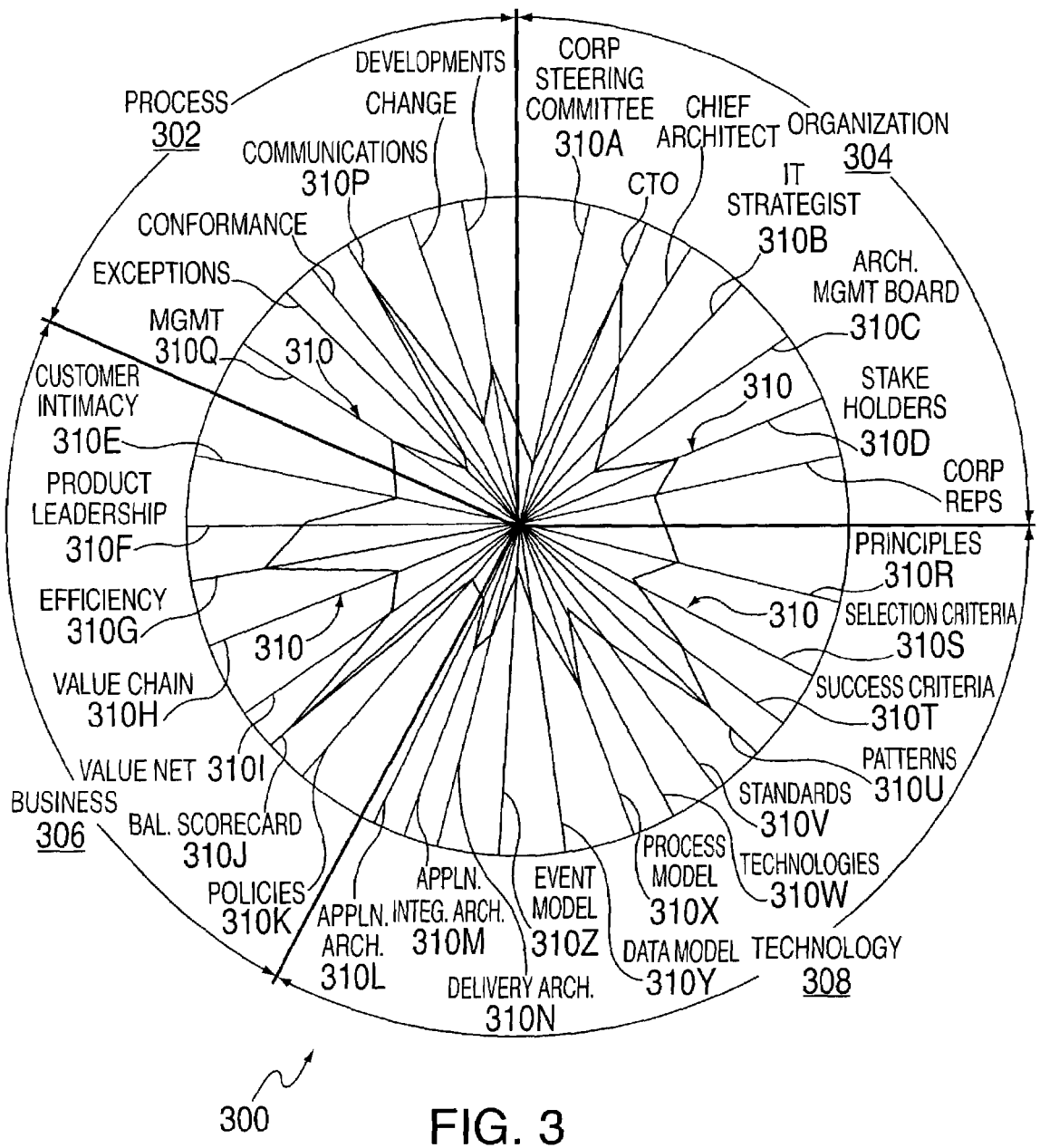
FIG. 3 is a polar graph of a sample maturity model map generated via the enterprise architecture assessment model in an exemplary embodiment.

Information is gathered for the elements provided in the maturity model map at step 202. Information can come from workshops, executive interviews, or other suitable sources. Information gathered may include problems or concerns that affect or are believed will affect the business enterprise. At step 204, it is determined whether sufficient information has been collected. If not, the process reverts back to step 202 where additional information is gathered. Once enough information has been acquired, it is analyzed at step 206. Analysis includes extracting and prioritizing issues stored in issues database 122 considered most relevant to the business enterprise. Issues may include any relevant concerns, problems, or deficiencies related to the elements 310 of the maturity model map. For example, an issue (also referred to herein as "problem") pertaining to efficiency element 310G of FIG. 3 may be delays reported in the manufacturing process. These issues can be weighted according to business rules adopted to ensure that serious issues are promptly addressed. Utilizing the information collected, the enterprise architecture assessment model generates a maturity model map at step 208 and stores it in pattern database 123. A sample maturity model map 300 is illustrated in FIG. 3.

The maturity model map is a numerically-generated diagram that presents a visual representation of the primary capabilities relevant to creating and sustaining an enterprise architecture. This visual representation allows for rapid and visual pattern analysis useful in assisting an architecture team or specialist in identifying issues and their root causes. The maturity model map is comprised of four quadrants or components as illustrated in FIG. 3. The four components are: architecture vitality processes (also referred to herein as "process component") 302, architecture roles and responsibilities (also referred to herein as "organization component") 304, business model (also referred to herein as "business component") 306, and technology (also referred to herein as "technology component") 308. Likewise, each component comprises several elements 310 that are determined to be relevant factors in creating and maintaining an enterprise architecture. Thirty-two elements 310 are illustrated in FIG. 3 for illustrative purposes; however, it will be understood that additional elements may be added or substituted therefor in order to realize the advantages of the invention. Throughout this description, the elements will be described collectively as "elements 310"; however, when addressed individually, they will be referred to herein by a unique identifier (e.g., 310A, 310B, 310C, etc.).

The process component 302 defines the primary processes managed by the information technology organization to support architecture definition, evolution, and usage. The graphical depiction of the communications element 310P as illustrated in FIG. 3 demonstrates the significance of this element as compared, not only to other process component 302 elements, but also elements from the other three components 304, 306, and 308 which may provide insight on possible interrelationships among the various elements as well as cross-component relationships.

The organization component 304 defines the primary organizational roles and constructs used across an enterprise to manage, evaluate, and support an enterprise architecture. The roles represented in 304 include executive leadership (e.g., Corporate Steering Committee 310A), strategy definition (e.g., IT strategist 310B), a variety of technology operational roles (e.g., architecture management board 310C), along with representatives from outside the technology organization who are directly, or indirectly, affected by the enterprise architecture (e.g., stakeholders 310D). Roles are used in this component, rather than positions, so that it can be determined if and how the necessary responsibilities are being managed, irrespective of the actual positions identified by the formal organization structure.

The business component 306 defines how the enterprise is run, what kinds of changes are imminent, and the primary criteria for success. For example, the customer intimacy element 310E relates to how the customer perceives the business. The concept of product leadership 310F deals with how important it is for the business to be first-to-market with a new product, or line of products, or the innovator of new products. Efficiency 310G relates to the operational excellence, service, etc. of the business as compared to its competitors. A value chain 310H is the relationship between the business and its suppliers, trading partners, and customers. A value network 310I deals with assessing opportunities that help a business understand how it interacts with customers, competitors, complementors, suppliers, and each other. A balanced scorecard 310J is a measurement system and framework for managing and implementing strategies such as financial, customer, internal processes, and growth.

The technology component 308 is further broken down into four categories: decision making support, repeatability, business linkages, and defined architectures. These categories identify 4 primary areas where businesses frequently have significant issues and map to a substantial number of detailed elements 310 in the maturity model map 300. The elements that define Decision Making Support (i.e., principles 310R, selection criteria 310S, and success criteria 310T) represent a variety of areas where an enterprise may, or may not, have a demonstrated capability. As the mix of capabilities vary in this area, a business enterprise will likely experience a number of different issues which correlate directly to the pattern represented by the elements 310 in this area. This is true for each of the four technology categories. Further, the capabilities represented by the elements 310 in each category show repeated and common interactions with each other. These common interaction patterns can be used to identify additional core issues for the enterprise being assessed. The elements for repeatability include patterns 310U, standards 310V, and technologies 310W. The elements for business linkages include process model 310X, data model 310Y, and event model 310Z. The elements for defined architectures include delivery architecture 310N, application integration architecture 310M, and application architecture 310L.

Turning back to FIG. 2, the data from the maturity model map 300 is mapped to data from root cause database 120 at step 210 in order to determine possible causes of the issues as experienced in the past. Utilizing the example in step 206 above, possible root causes for the delays in production might include difficulties in business operations such as excessive maintenance performed on production equipment, or frequent shortages reported in production supplies. Human relations-related causes might include staffing issues and/or training issues. Root causes could be economic such as a labor strike or perhaps political, such as a nationwide boycott. Root cause database 120 stores these historical root causes of issues. Pattern database 123 stores collections of maturity model maps generated over time for facilitating the pattern analysis process performed by the enterprise architecture assessment model. Pattern analysis techniques are used at step 212 to compare the resulting mapped data resulting in possible patterns or relationships among the issues detected. The pattern analysis in this method can be performed either visually, by inspecting the maturity model map, or via a computerized analysis of the data used to generate the map. In either case, the information is searched for patterns that repeat from client to client, as well as patterns related to high profile issues. For example, a pattern detected for the above example might indicate that when policies element 310K is low and management element 310Q is low, then customer intimacy element 310E begins to decrease. Thus, pattern analysis can detect not only current pattern relationships but can also potentially predict future issues. There is a well defined set of issues which correlate to these patterns and a number of potential actions for an organization, depending on how their priorities dictate addressing the related issues.

Notable patterns resulting from the analysis are used by the enterprise architecture assessment model to create an Issues to Root Causes Report at step 214. For every issue reported for elements 310 of the maturity model map, an Issues to Root Causes Report can be generated. The issues identified in this report, and the associated root causes, may then be prioritized according to the preferences of the business enterprise at step 216.

Pattern analysis is used on the prioritized issues in order to link root causes to recommended best practices at step 218. This step allows for further refinement of the assessment and solution process. The information from the prioritized issues is mapped to information in best practices database 126 for assisting in resolving the issues. For example, using the 'delays' issue above, the best practices linked to this issue and its root cause might include reviewing the current policies on the training practices of the enterprise, increase training funding for specialized equipment operators, and review the qualifications criteria of newly hired employees. Various management individuals review the suggested best practices and select those that are most appropriate. From the information resulting from step 218, an action plan is generated at step 220 and a final report is created at step 222. The final report may provide insight as to potential future issues or to correlate identified issues with those anticipated by the maturity model map. Periodically, the effectiveness of the process is reviewed and updated as needed at step 224. Initial surveys are created and issued at step 226. The initial surveys seek out immediate impressions from individuals as to the efficacy of the process. The results of these initial surveys may result in modifications to the action plan if necessary. For example, the training programs may be outdated as new and advanced equipment is brought on board. Surveys and analysis may indicate that outside training would be more effective and less costly to implement. Repositories 120–128 impacted by the results of the initial surveys are updated at step 228. These repositories hold information which are used at various stages of this method and are updated as appropriate based on discoveries made during and after the assessment process.

As indicated above, pattern database 123 stores information about patterns as ascertained from within and among the maturity model maps. Information stored about the patterns includes absolute and/or relative data values of related elements 310, a name, and brief description of the pattern. These are associated with one or more issues stored in issues database 122. The issues, likewise, are associated with one or more patterns. Along with identifying pattern dependencies, issues database 122 also includes name and descriptive information, links to potentially related issues, and an indication of the impact of this issue on the enterprise. Impact information is stored in business impact database 124 and includes documented effects of addressing problems stored in issues database 122. These documented effects may be useful in assisting the business enterprise in prioritizing these problems. Additionally, these documented effects may come from information outside of the business enterprise, such as other businesses in related industries. Recommendations may include the use or application of best practices, so this information is also maintained in the system in best practices database 126. Best practices recommendations in database 126 are linked to issues, or where appropriate, groups of associated issues in issues database 122. Statistical information from repeated assessments is gathered and stored in a statistical repository 128. This is used to provide size, industry, and other relevant correlations during the report generation phase of step 222.

Turning back to step 214, the information contained in the "Issues to Root Causes Report" is updated in root cause database 120 at step 230 and again in one or more repositories 122–128 impacted by the information in the report at step 228. Future surveys are generated after 30 days, at step 232, to ascertain the initial effectiveness of the process, and again after 180 days, at step 234, to measure the results of the process on the enterprise architecture and the business results to date. The processes recited in steps 202–232 can be repeated periodically as desired by the business enterprise.

As can be seen, enterprise architectures can be created by gathering and organizing comprehensive and critical information specifically targeted to assess the complex structures required by a business enterprise, and integrating these structures to achieve optimal operational efficiency. At a glance, an analyst can gather insight on patterns of issues facing the enterprise architecture as well as establishing relationships among the elements of a component and cross-component relationships. By comparing these maturity model maps against previous maturity model maps and action plans, any deficiencies in the system can be addressed almost immediately.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A system for creating and maintaining an enterprise architecture over a network, comprising:
   at least one client system;
   a server operably coupled to said at least one client system via said network;
   a plurality of business applications executable via said server;
   a data storage device in communication with said server via said network, the data storage device storing databases housing information resulting from execution of the plurality of business applications, the databases including an issues database, a root cause database, and a pattern database; and
   an enterprise architecture assessment model executing on said system, the enterprise architecture assessment model performing:
      extracting issues from the issues database;
      prioritizing the issues extracted;
      analyzing the issues in light of information gathered relating to concerns that affect a business enterprise;
      generating a maturity model map using results of the analyzing, the maturity model map including a process component, an organization component, a business component, and a technology component;
      storing the maturity model map in the pattern database; and
      mapping data in the maturity model map to the root cause database, the root cause database storing historical data identifying root causes of issues previously detected.

2. The system of claim 1, wherein said process component, said organization component, said business component, and said technology component further comprise a plurality of elements selectable by the business enterprise.

3. The system of claim 2, wherein said maturity model map comprises a graphical representation, said graphical representation illustrating a comparative significance of said plurality of elements resulting from information stored in said data storage device.

4. The system of claim 2, wherein data relating to the issues in said issues database is linked to data in said root cause database and data in said pattern database.

5. The system of claim 4, wherein said data relating to the issues in said issues database includes problems related to said plurality of elements determined to be of concern to said business enterprise.

6. The system of claim 5, wherein said data in said root cause database includes root causes of the issues stored in said issues database.

7. The system of claim 6, wherein said data in said pattern database includes relationships and patterns detected in said data relating to the issues stored in said issues database and said data stored in said root cause database.

8. The system of claim 7, where said data in said pattern database further includes a plurality of maturity model maps generated over a period of time.

9. The system of claim 5, wherein said data storage device further stores a business impact database, wherein further data stored in said business impact database includes documented effects of addressing said problems stored in said issues database, said documented effects operable for assisting said business enterprise in prioritizing said problems.

10. The system of claim 9, wherein said data stored in said business impact database is linked to said data stored in at least one of:
    said issues database;
    said root cause database; and
    said pattern database.

11. Time system of claim 5, wherein said data storage device further stores a best practices database, wherein data stored in said best practices database includes recommended actions for resolving said problems based upon analysis of said data stored in at least one of said:
    issues database;
    root cause database; and
    said pattern database.

12. The system of claim 11, wherein said data stored in said best practices database is linked to said data stored in at least one of said:
    said issues database;
    said root cause database; and
    said pattern database.

13. The system of claim 4, wherein said data storage device further stores a statistical database, wherein data stored in said statistical database includes information obtained from repeated assessments operable for assisting said business enterprise in providing size, industry, and related correlations in reports.

14. The system of claim 13, wherein said data stored in said statistical database is linked to said data stored in at least one of said:
    issues database;
    root cause database; and
    pattern database.

15. The system of claim 6, further comprising an Issues to Root Causes report generated by said enterprise architecture assessment model, said Issues to Root Causes report including said problems stored in said issues database and corresponding root causes of said problems stored in said root cause database.

16. The system of claim 15, further comprising an Action Plan comprising prioritized problems and selected courses of action for resolving said problems.

17. The system of claim 16, further comprising surveys, said surveys comprising:
an initial survey operable for receiving feedback on immediate impressions relating to the efficacy of said action plan; and
future surveys operable for receiving feedback on results of one or more action plans on said enterprise architecture.

18. The system of claim 17, wherein results of said feedback causes said business enterprise to modify said action plan.

19. The system of claim 2, wherein elements associated with said process component relate to primary processes managed by an information technology organization to support enterprise architecture definition, evolution, and usage for said business enterprise.

20. The system of claim 2, wherein said elements associated with said organization component relate to primary organization roles and constructs used across said business enterprise to manage, evaluate, and support said enterprise architecture.

21. The system of claim 2, wherein said elements associated with said business component relate to how said business enterprise is operated, potential imminent changes, and primary success criteria.

22. The system of claim 2, wherein said elements associated with said technology component relate to primary areas in which said business enterprise has been determined to have significant issues, said primary areas categorized by:
a decision making support category;
a repeatability category;
a business linkage category; and
a defined architecture category.

23. The system of claim 22, wherein said decision making support category includes:
a principles element;
a selection criteria element; and
a success criteria element.

24. The system of claim 22, wherein said repeatability category includes: a patterns element;
a standards element; and
a technologies element.

25. The system of claim 22, wherein said business linkages category includes:
a process model element;
a data model element; and
an event model element.

26. The system of claim 22, wherein said defined architectures category include:
a delivery architecture element
an application integration architecture element; and
an application architecture element.

* * * * *